UNITED STATES PATENT OFFICE.

RICHARD LAUCH AND CARL KREKELER, OF ELBERFELD, GERMANY, ASSIGNORS TO THE FARBENFABRIKEN, VORMALS FR. BAYER & CO., OF SAME PLACE.

MANUFACTURE OF DYE-STUFFS.

SPECIFICATION forming part of Letters Patent No. 438,438, dated October 14, 1890.

Application filed February 21, 1890. Serial No. 341,317. (Specimens.) Patented in France May 27, 1889, No. 198,521.

*To all whom it may concern:*

Be it known that we, RICHARD LAUCH and CARL KREKELER, chemists, assignors to the Farbenfabriken, vormals, Fr. Bayer & Co., at Elberfeld, subjects of the King of Prussia, residing at Elberfeld, Germany, have invented a new and useful Improvement in the Manufacture of Dye-Stuffs, (for which we have already obtained Letters Patent in France, No. 198,521, dated May 27, 1889,) of which we give in the following a clear and exact description.

Our invention relates to the manufacture of a new blue-black dye-stuff for dyeing wool and printing cotton obtained from amidosalicylic acid.

We proceed as follows: 11.5 kilos, by weight, of amidosalicylic acid are dissolved in water, cooled by ice and mixed with a watery solution of five kilos, by weight, of sodium nitrite. On the addition of hydrochloric acid the diazo compound separates as a fine crystal powder, and the diazotation is finished after standing for about half an hour. To the diazo compound thus obtained a hydrochloric-acid solution of about ten parts, by weight, of alpha-naphthylamine is added under continuous stirring. On the addition of sodium acetate, the formation of the dye-stuff immediately begins, and is finished after standing for twelve hours and heating to about 50° centigrade. It is filtered off in order to remove any alpha-naphthylamine which may not have taken place in the reaction. For the further diazotizing of the amidoazo compound thus obtained, the same is dissolved in diluted alkali mixed with a watery solution of five kilos, by weight, of sodium nitrite and acidulated with diluted hydro-chloric acid under continuous stirring. The first-formed black precipitate gradually becomes a clearer color, and after standing for about three-fourths of an hour a brown precipitate represents the new diazo compound. This diazo compound is poured into an alkaline solution of about twenty-five kilos, by weight, of alpha-naphthol-sulpho-acid made alkaline by sodium carbonate. The dye-stuff combination begins immediately and is finished by heating at 50° centigrade. It is filtered off and dried.

The dye-stuff obtained has the following constitution:

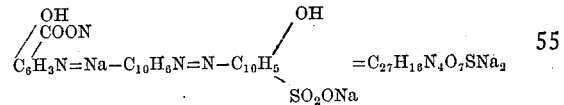

and before drying forms a blue-black paste and in a dry state a blue-black powder, which is difficultly soluble in cold water, more easily in hot water, with a blue-violet color, which color changes to green-blue on addition of soda-lye. A watery solution is colored blue-red on addition of acetic acid. Mineral acids separate the dye-stuff acid out of a watery solution, as a blue-black precipitate. In concentrated sulphuric acid it dissolves with green-blue color. By reducing agents the dye-stuff is discolored and decomposed.

The new dye-stuff prints cotton violet and dyes wool blue-black in a neutral or weak acid-bath, and if mordanted with chromium salts it dyes with a clear blue-black color, which dye-tests are absolutely fast to soap, sunlight, and milling.

Having thus described our invention, and in what manner the same is to be ascertained, what we claim as new, and desire to secure by Letters Patent, is—

The dye-stuff or coloring-matter hereinbefore described, which is produced by the combination of the diazo compound of amidosalicylic acid with alpha-naphthylamine, again diazotizing the amidoazo compound obtained and recombining the diazo compound obtained with alpha-naphthol-sulpho-acid, and which has the composition and the following characteristics: it forms a blue-black paste and in a dry state a blue-black powder, is difficultly soluble in cold water, easily in hot water with a blue-violet color, which color changes to green-blue on addition of soda-lye and is separated as dye-stuff acid out of a watery solution on addition of mineral acids, substantially as described.

In testimony whereof we have signed our names in presence of two subscribing witnesses.

RICHARD LAUCH.
CARL KREKELER.

Witnesses:
ALEXANDER NIEME,
AUGUST BLANK.